United States Patent

Meuleman

[15] 3,646,410

[45] Feb. 29, 1972

[54] RADIATION DETECTOR HAVING A CLAMPED CRYSTAL

[72] Inventor: Johannes Meuleman, Caen, France

[73] Assignee: U.S. Philips Corporation, New York, N.Y.

[22] Filed: Sept. 17, 1970

[21] Appl. No.: 73,119

[30] Foreign Application Priority Data

Sept. 24, 1969 France ....6932554

[52] U.S. Cl. ....317/235 R, 317/235 N, 317/234 G, 250/83, 62/514, 329/203, 313/283

[51] Int. Cl. ....H01l 11/00, H01l 15/00

[58] Field of Search ....329/203, 204, 205; 317/234, 317/235, 27; 62/514, 514 A; 250/71.5, 80, 83.3; 313/281, 282, 283, 284, 285, 286, 287; 117/1

[56] References Cited

UNITED STATES PATENTS 2,267,318 12/1941 Aicher ....313/282 X
3,255,351 6/1966 Waish et al. ....250/83
3,524,985 8/1970 Sayres ....250/83.3
3,538,356 11/1970 Huth ....250/83.3

FOREIGN PATENTS OR APPLICATIONS 1,020,117 11/1952 France ....329/205

*Primary Examiner*—John W. Huckert
*Assistant Examiner*—Andrew J. James
*Attorney*—Frank R. Trifari

[57] ABSTRACT

The invention relates to a radiation detector which comprises a crystal having two coaxial zones of opposite conductivity types, which zones may be separated by an intrinsic zone, between which first-mentioned zones a radiation-sensitive junction is formed, the crystal being secured in a hermetically sealed envelope consisting of a boxlike holder and a cover, the connection consisting of a clamping support which encloses the crystal and which is secured to the boxlike holder.

7 Claims, 4 Drawing Figures

INVENTOR.

BY JOHANNES MEULEMAN

Frank R. Trifari

AGENT

*INVENTOR.*

*BY* JOHANNES MEULEMAN

Frank R. Trifari
AGENT

RADIATION DETECTOR HAVING A CLAMPED CRYSTAL

The invention relates to a radiation detector comprising a semiconductor crystal which has two coaxial zones of opposite conductivity types which may be separated by an intrinsic zone, between which two first-mentioned zones a radiation-sensitive junction is formed, the crystal being secured in a hermetically sealed envelope consisting of a boxlike holder and a cover.

In order to increase the response range and the response quality of detectors to ionized radiation it is advantageous to enlarge the volume of the crystal which is sensitive to the radiation. For that purpose, use is generally made of detector crystals having an intrinsic or compensated zone between two coaxial zones of opposite conductivity types which form a radiation-sensitive junction.

In order to enable storage, transport and maintenance of the quality of a semiconductor crystal for longer periods of time, the radiation detector is incorporated in a sealed envelope which forms a protection against possible impurities. This is necessary, in particular, for germanium detectors which comprise an intrinsic, lithium compensated zone and which must be used at a temperature in the order of magnitude of that of liquid nitrogen and which must also be stored at a very low temperature.

The enlargement of the effective volume of the crystal, however, produces an increase of the weight thereof, as a result of which the securing and the centering in the envelope presents difficulties. Moreover, it is necessary to increase the rigidity of the envelope which generally consists of aluminum, for which purpose the wall thickness must be considerably increased. This wall thickness may become a few millimeters, also in the part which forms the entrance window for the rays, as a result of which the phenomena of retrodiffusion or reemission can occur. Moreover, as a result of the weight, the connection means of the crystal of the detector of the envelope must be reinforced so as to prevent the detector from sliding or rotating which could produce a decrease in sensitivity and a poor thermal contact. This reinforcement of the connection means results in the necessity of further treatments, either of the crystal or of the envelope, as a result of which the cost of the detector is increased and the possibility of damage or destruction during its operation is increased.

Cylindrical, coaxial detectors are known (detectors of which the crystal comprises two coaxial layers) which have a plane surface which is present parallel to the centerline of the cylinder of the crystal, as a result of which it becomes possible to prevent a rotational movement in the envelope. Such a plane surface, however, must be provided very accurately and requires a long-lasting process, as a result of which it is subject to great drawbacks. Moreover, such a plane surface does not prevent the detector from sliding in its envelope, which sliding can bearly be prevented by a strong clamping of the crystal, and, in certain cases, may cause damage to the crystal.

It is the object of the invention to provide a coaxial detector the crystal of which is incorporated permanently in the envelope in the desirable manner so as to obtain protection which is as efficacious as possible. In order to reach the desired end, according to the invention, the crystal is incorporated in a clamping support which encloses the crystal and which is secured to the boxlike holder.

The invention makes it possible to obtain an envelope having a wall of a small thickness because the only function of the envelope is to form a sealed space. The envelope need not contribute to the securing of the crystal. Since the wall thickness of the envelope may be smaller, it is possible to provide the envelope with an entrance window for rays which causes a minimum absorption and/or retrodiffusion. Moreover, the detector according to the invention can be applied in all kinds of circumstances of the atmosphere, in particular under a high vacuum or at low temperature.

According to the invention, the clamping support which encloses the crystal may comprise two peel-shaped parts which are united by connection means. The support and the crystal are incorporated in the holder by connection means which engage the outside of the support. Such an embodiment is of particular importance in the case of detectors having a geometrically clearly defined shape, notably for cylindrical detectors. In that case, a clamping ring or a chain which comprises a screw and nut is preferably used as a connection means of the unit holder-support-crystal. This embodiment enables a rapid and simple assembly in which substantially all possibilities of damage to the crystal are prevented.

According to another embodiment, the clamping support which encloses the crystal may comprise a tube which has longitudinal slots and which consists of a resilient material. The inside dimensions of the tube are chosen in accordance with the shape and the outside dimensions of the crystal. Such an embodiment which is to be preferred from a point of view of solidity has the additional advantage that it can simply be manufactured. Moreover, such an embodiment can be used for all types of detectors.

In a third embodiment, the clamping support which encloses the crystal may be constructed in the form of a can in which the crystal is enclosed. This embodiment is of particular importance in those cases in which the outer surfaces of the detector are not directly subject to radiation, for example, in an arrangement which comprises a pit. In such a case in which the source of radiation is situated at the bottom of the pit, the outer zone of the detector is of little influence and a support constructed in this manner provides a ready support without adversely influencing the characteristics of the detector.

The support may be manufactured from a metal which has a good electric conductivity, particularly in the case in which for the benefit of the space and the weight the support is used as an electric connection between the outer surface of the detector and the holder which also consist of metal. The support may alternatively consist of an insulating material and mainly of a ceramic material particularly in the case in which, for reasons of the weight of the detector, the support must be comparatively thick without causing important disturbance in the properties by absorption or retrodiffusion of the rays.

In order that the invention may be readily carried into effect, this and other embodiments will now be described in greater detail, by way of example, with reference to the accompanying drawings, in which.

Figures 1, 2:
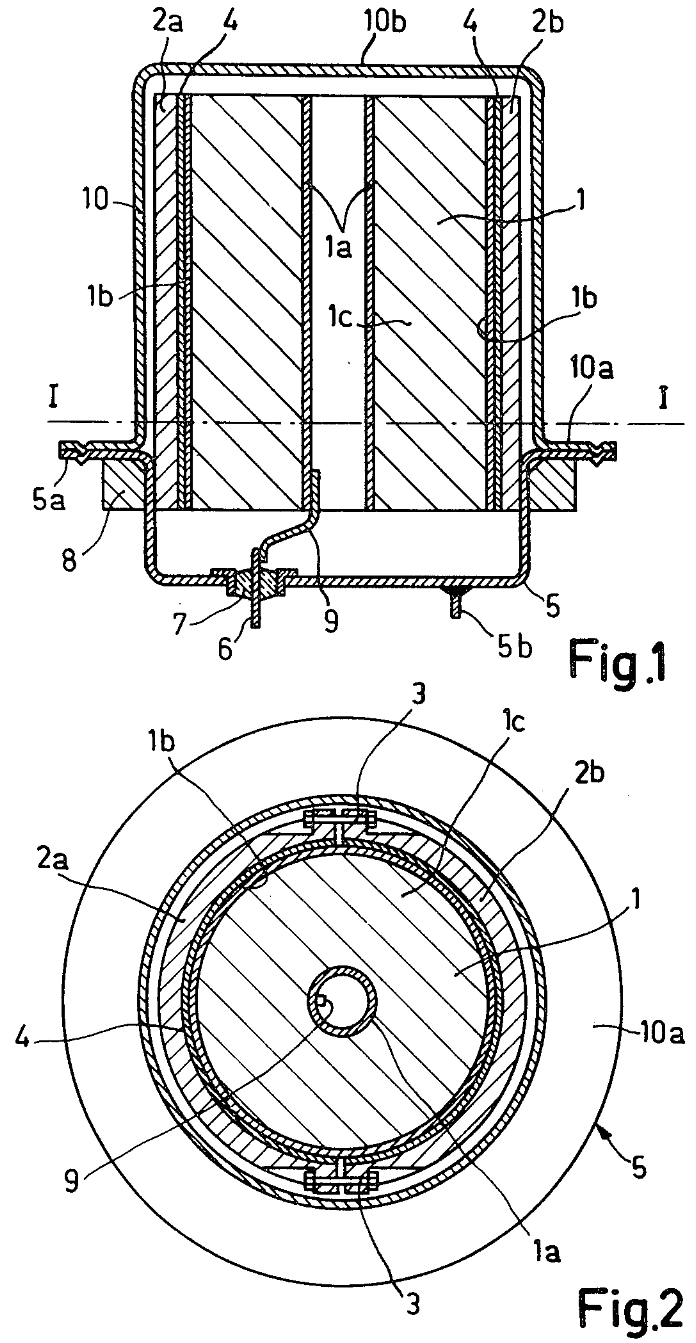
FIG. 1 is a cross-sectional view of an embodiment of a radiation detector.
FIG. 2 is a cross-sectional view taken on the line I—I of FIG. 1.

The coaxial semiconductor detector shown in FIGS. 1 and 2 comprises a cylindrical crystal 1, which is mounted in two metal dishes 2*a* and 2*b* which preferably consist of aluminum. The dishes are connected together by connection means 3, for example, bolts and nuts. The crystal comprises a central continuous cavity and has two semiconductor layers 1*a* (inner layer) and 1*b* (outer layer) which are separated by an intrinsic zone 1*c*.

The inner surface of the dishes 2*a* and 2*b* (so the surface facing the crystal 1) may be covered with a layer 4 of indium to facilitate the electric contact between the dishes 2*a* and 2*b* and the outer zone 1*b* of the crystal.

The assembly which is formed by the crystal 1 and the support which consists of the dishes 2*a* and 2*b* is placed in a metal boxlike holder 5, preferably of aluminum, the wall thickness of which is small. A current supply wire 6 is provided in the holder 5 and is passed through the wall of the holder by means of an insulating lead-in member 7.

The support which is formed by the dishes 2*a* and 2*b* as well as the crystal 1 are secured in the holder 5 by means of a ring 8, arranged outside the holder and engaging the wall of the holder in a clamping manner. The inner zone 1*a* of the crystal is connected to the current supply wire 6 by means of a metal wire 9 having a good electric conductivity, while a wire 5*b* which is electrically connected to the zone 1*b*, via the holder 5, the dishes 2*a* and 2*b*, and the layer 4, is welded to the outside of the boxlike holder.

With the exception of the welding of the wire 5*b*, the various operations are preferably carried out in a vacuum to prevent the supply of impurities which might reduce the effect of the detector and even eliminate the effect altogether.

The last operation is to provide a cover 10 on the holder 5, likewise in a vacuum. This cover may consist either entirely of metal, for example, aluminum or beryllium, and in that case preferably of aluminum having a small thickness, or consist partly of metal and partly of a ceramic material. The thickness of the metal part is in the order of magnitude of 0.5 mm. The cover comprises in its metal part a flange 10*a*, which is secured to the corresponding flange 5*a* of the holder 5 by means of cold welding or in another suitable manner.

The boxlike holder 5 may comprise an exhaust tube (not shown) which enables the evacuation of the envelope after providing the cover 10, the exhaust tube being then sealed hermetically.

Figure 3:
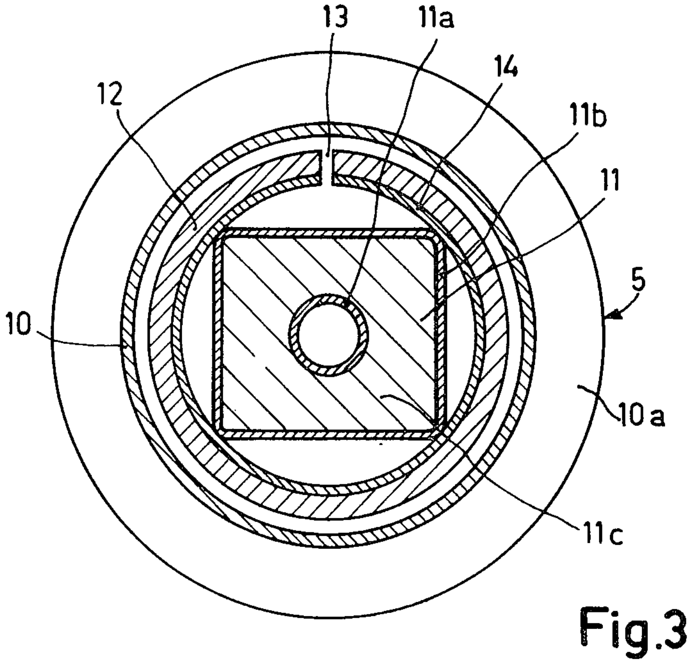
FIG. 3 is a cross-sectional view of a detector according to another embodiment of the invention.

The embodiment of the detector shown in FIG. 3 comprises a crystal 11 of a square shape which comprises two coaxial zones 11*a* and 11*b* of opposite conductivity types which are separated by an intrinsic layer 11*c*. The crystal 11 is enclosed in a tube 12 comprising longitudinal slots, the inside diameter of said tube prior to providing the crystal 11 being slightly smaller than the length of the diagonal of the square of which the cross section of the crystal consists. The tube 12 which comprises a longitudinal slot 13 consists of a material which is electrically conductive and is comparatively resilient so that the crystal 11 is rigidly held by its ribs, while, in addition, a good electric contact with the outer zone 11*b* is obtained. In order to ensure a good electric contact, a layer of indium may be provided on the inner surface of the tube 12 as is described also with reference to the embodiment shown in FIGS. 1 and 2.

Figure 4:
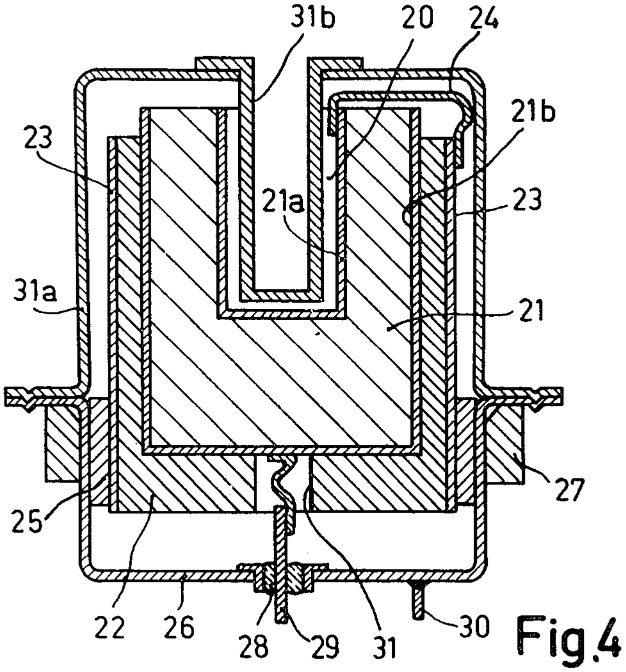
FIG. 4 is a longitudinal cross-sectional view of a detector which comprises a pit according to still another embodiment of the invention.

FIG. 4 shows a third embodiment of the detector according to the invention. It comprises a coaxial detector the crystal 21 of which comprises a pit 20. The crystal 21 which comprises two zones 21*a* and 21*b* of opposite conductivity types, one of which, 21*a*, is adapted to the shape of the pit 21, is arranged in a pan 22 and secured therein by means of a glue or the like. Since the crystal 21 has a large weight, the walls of the pan 22 are comparatively thick and the pan preferably consists of an 22 insulating material in particular of a ceramic material, for example, aluminum oxide or beryllium oxide. The pan 22 is covered on its outside with a metal layer 23 as a result of which an electric connection to the inner zone 22*a* of the crystal 21 is obtained via a bridge member 24.

The assembly of crystal 21 and pan 22 is incorporated in a metal support 21, and then placed in a boxlike holder 26 which also consists of metal. The assembly is held by means of a ring 27 which engages the wall on the outside of the holder 26 in a clamping manner at the height of the support 25.

The holder 26 consisting of metal, an insulating lead-in member 28 is provided through which a current supply wire 29 extends. This current supply wire electrically contacts the outer zone 21*b* of the crystal 21 opposite to a cavity 31 which is present in the pan 22. A current supply wire 30 is welded against the outside of the holder 26 and electrically contacts the inner zone 21*a* of the crystal via connection 24, the metal layer 23, the support 25 and the holder 26.

The cover which closes the holder 26 comprises a metal part 31*a* (for example, of aluminum) which is secured to the holder by means of a welding operation, and comprises a part 31*b*, preferably of an insulating ceramic material, which is secured to the part 31*a* of the cover by means of hard soldering and which has a shape such that it can extend within the pit of the detector. The part 31*b*, however, may also consist of metal, for example, aluminum or beryllium.

The various embodiments described enable a considerable increase of the useful effect of the coaxial detectors, the phenomena of absorption and retrodiffusion which are due to thick metal walls at the area where the detector is subjected to radiation being strongly reduced.

What is claimed is:

1. A radiation detector comprising a semiconductor crystal having two coaxial zones of opposite conductivity types forming a radiation sensitive junction, hermetically sealed envelope enclosing said crystal, said envelope comprising a cover and a boxlike holder, and a clamping support which encloses said crystal and which is secured to said boxlike holder.

2. A radiation detector as claimed in claim 1, wherein the clamping support comprises two peel-shaped parts which are united by connection means.

3. A radiation detector as claimed in claim 1, wherein the clamping comprises a tube which is provided with at least one longitudinal slot and which comprises a resilient material.

4. A radiation detector as claimed in claim 1, wherein the clamping support is constructed in the form of a can in which the crystal is incorporated.

5. A radiation detector as claimed in claim 1, wherein the clamping support is connected to the boxlike holder by means of a flexible clamping ring.

6. A radiation as claimed in claim 5, wherein the clamping support is connected to the boxlike holder by a ring arranged outside the holder and exerting a clamping force on the support.

7. A radiation detector 25 claimed in claim 1, wherein the clamping support comprises at least one wall which is covered with an electrically conducting layer which forms part of an electric connection between one of the coaxial zones of the crystal and a supply wire to the detector.

* * * * *